United States Patent [19]

Silva

[11] Patent Number: 5,035,903

[45] Date of Patent: Jul. 30, 1991

[54] HIGH FIBER BAKERY PRODUCTS

[75] Inventor: Roy F. Silva, Norwalk, Conn.

[73] Assignee: International Flavors & Foods Ingredients Company, division of Indopco, Inc., Del.

[21] Appl. No.: 869,477

[22] Filed: Jun. 2, 1986

Related U.S. Application Data

[63] Continuation-in-part of Ser. No. 755,871, Jul. 17, 1985, abandoned.

[51] Int. Cl.$^5$ .............................................. A21D 2/36
[52] U.S. Cl. ...................................... 426/19; 426/549
[58] Field of Search ................................... 426/19, 549

[56] References Cited

U.S. PATENT DOCUMENTS

| | | |
|---|---|---|
| 3,560,219 | 2/1971 | Attebery . |
| 4,036,999 | 7/1977 | Grindstaff ............................ 426/41 |
| 4,198,438 | 4/1980 | Singer et al. ........................ 426/549 |
| 4,395,426 | 7/1983 | Fan ...................................... 426/62 |
| 4,399,160 | 8/1983 | Schwartz et al. ..................... 426/41 |
| 4,405,648 | 9/1983 | Atsumi ................................. 426/19 |
| 4,406,911 | 9/1983 | Larson et al. ........................ 426/19 |
| 4,424,237 | 1/1984 | Wittman .............................. 426/653 |
| 4,442,128 | 4/1984 | Schwartz et al. ..................... 426/41 |
| 4,444,792 | 4/1984 | Schwartz et al. ..................... 426/41 |
| 4,444,793 | 4/1984 | Schwartz et al. ..................... 426/41 |
| 4,450,177 | 5/1984 | Larson et al. ........................ 426/19 |
| 4,481,222 | 11/1984 | Fan ...................................... 426/62 |
| 4,500,548 | 2/1985 | Silva .................................... 426/19 |

FOREIGN PATENT DOCUMENTS

| | | |
|---|---|---|
| 1109726 | 9/1981 | Canada . |
| 1142387 | 3/1983 | Canada . |
| 5509703 | 6/1978 | Japan . |
| 7899347 | 8/1978 | Japan . |
| 54-129151 | 10/1979 | Japan . |
| 58-09641 | 1/1983 | Japan . |
| 7906460 | 3/1981 | Netherlands . |
| 1556815 | 11/1979 | United Kingdom . |

OTHER PUBLICATIONS

Handbook of Food Additives, 2nd Ed., pp. 325–341, CRC Press, 1972.

*Primary Examiner*—Joseph Golian
*Attorney, Agent, or Firm*—Edwin M. Szala

[57] ABSTRACT

Bakery goods containing increased levels of dietary fiber while maintaining specific volume and softness can be prerpared by incorporating in the fiber containing bread a sufficient amount of functionalized dairy product containing a thickening polymer characterized by a viscosity of above about 200 centipoises and at shear rate of $12s^{-1}$.

16 Claims, No Drawings

HIGH FIBER BAKERY PRODUCTS

CROSS REFERENCE TO RELATED APPLICATION

The present application is a continuation-in-part of Ser. No. 755,871 filed 7/17/85 and now abandoned.

BACKGROUND OF THE PRESENT INVENTION

The present invention relates to improved bakery products having a high dietary fiber content.

The nutritional benefits of fiber in the diet are well-known. The addition of dietary fiber to bakery products such as bread causes difficulties since fiber has a deleterious effect on bread quality. The addition of fiber dilutes the gluten, while fiber particles affect the film forming and stretching characteristics of the gluten film. Lower loaf volumes are the result. In order to overcome this problem, it is a common practice to add vital wheat gluten to compensate for the volume loss.

In bread containing shortening, small amounts of fiber do not seriously affect the specific volume. However, the specific volume is seriously affected as the amount of fiber is increased. Because fiber breads are normally sold to persons who are health conscious, it is undesirable to maintain a high fat content or a high calorie content in the bread. While the beneficial effect of a portion of the shortening can be offset by the use of a surfactant emulsifier such as sodium stearoyl 2-lactylate (such as that sold under the trademark EMPLEX ™), the degree of offset decreases as the amount of dietary fiber increases. While a reduced amount of shortening in combination with either the sodium stearoyl 2-lactylate or a mono and diglyceride can effectively offset the shortening at low fiber levels, the effectiveness of these combinations in maintaining specific volume decreases as the amount of fiber increases.

However, as the shortening is decreased so is the effect of lipid derived surfactants to offset the deleterious effect of the fiber. It is therefore desirable to prepare high dietary fiber-containing bakery products such as bread, which have an effectively high specific volume to maintain the loaf organoleptically acceptable, while being able to reduce the shortening level in the bread. It would also be desirable to achieve these ends while maintaining softness in the bread.

BRIEF SUMMARY OF THE INVENTION

In accordance with the present invention, it has been found that improved yeast-raised bakery products containing dietary fiber can be prepared by adding thereto a sufficient amount of a functionalized dairy product containing a thickening polymer prepared with a polymer-producing microorganism that grows on the dairy product substrate, the functionalized dairy product being characterized by a viscosity of above about 200 centipoises at a shear rate of $12s^{-1}$ in a 1% weight per volume solution. Preferred microorganisms are of the genus Xanthomonas such as *Xanthomonas campestris*. Microorganisms of the species *Leuconostoc mesenteroides* can also be used. The functionalized dairy product can interact with the starch to supplement or, in some cases, replace the gluten network and minimize starch retrogradation in the baked goods. The functionalized dairy product evidences improved water absorption to keep the fiber-containing baked good softer. A protein and starch interaction with the functionalized dairy product can also supplement the gluten network for improved volume and texture of the baked goods. Bakery products and particularly bread can be prepared without the addition of loaf volume improvers or antistaling agents. In some instances, milk replacers and/or part of the shortening can also be deleted from the recipe without detriment to the final bakery product. Since the functionalized dairy product is not fat activated, lower fat levels can be used without a decrease in results.

DETAILED DESCRIPTION OF THE INVENTION

Functionalized dairy products containing a thickening polymer for use in the present invention can be prepared by fermenting a polymer-producing organism in a dairy-based substrate containing carbohydrates suitable for growing the desired microorganism. The functionalized dairy product containing a thickening polymer can be prepared by fermenting a suitable dairy-based growth substrate with an organism of the genus Xanthomonas which provides the functional polymer thickener having a viscosity of above 200 centipoise at a shear rate of $12s^{-1}$ such as *Xanthomonas campestris* and/or *Leuconostoc mesenteroides* or mixtures of those products. Preferably, the microorganism is selected from the group of *X. campestris* ATCC 31922, *X. campestris* ATCC 31923, and/or *L. mesenteroides* ATCC 14935. Functionalized dairy products prepared with these microorganisms are disclosed in:

U.S. Pat. No. 4,399,160 which discloses a dry blend of functionalized whey products prepared from *X. campestris* ATCC 31923 and *L. mesenteroides* ATCC 14935;

U.S. Pat. No. 4,442,128 which discloses a functionalized whey and glucose product prepared by fermenting with *X. campestris* ATCC 31922;

U.S. Pat. No. 4,444,792 which discloses whey functionalized by fermenting with *X. campestris* ATCC 31923; and U.S. Pat. No. 4,444,793 which discloses a functionalized whey and sucrose product prepared by fermenting with *L. mesenteroides* ATCC 14935.

The disclosures of U.S. Pat. Nos. 4,399,160; 4,442,128; 4,444,792 and 4,444,793 are incorporated herein by reference. The stated organisms are on deposit with the American Type Culture Collection, Rockville, MD.

The functionalized dairy-based products used in the invention can be prepared by fermenting a dairy-based carbohydrate-containing substrate adapted for growing the particular microorganism used. *X. campestris* ATCC 31923 has the ability to utilize lactose as its sole source of carbon; *X. campestris* ATCC 31922 reproduces on a substrate of glucose while *L. mesenteroides* requires a substrate of sucrose as the carbohydrate source in addition to the dairy base. The lactose for the substrate can be added as pure lactose or as part of another dairy-based product such as milk, defatted milk, milk solids, milk solids non-fat, whey, deproteinized whey such as by gel filtration or ultrafiltration, demineralized whey such as by ion exchange, chemical isolation or ultrafiltration, deproteinized demineralized whey and any other lactose-containing milk byproduct obtained from the processing of milk, cheese or whey. The lactose-containing product must be in a form which can be used by and not toxic to the microorganism. Included in deproteinized whey are the byproducts from the concentration of whey protein using gel filtration (U.S. Pat. Nos. 3,560,219 and 4,036,999) and particularly the lactose-containing permeate resulting from the separation of whey protein from whey by ultrafiltration. The substrate is preferably pasteurized or sterilized to prevent growth of contaminant bacteria, such as those which might change the flavor or odor characteristics.

The substrate must contain the critical carbohydrate in an amount sufficient to allow significant microorganism growth. Where lactose is used, the term "lactose" is intended to refer to unhydrolyzed lactose. Lactose is considered a dairy product for purposes of this application. Where glucose is used, the term "glucose" can include, in addition to glucose, lactose hydrolyzed to glucose and galactose.

It is also desirable to incorporate in the substrate (or fermentation broth), a nitrogen-containing composition which acts as a stimulant for the growth of the bacteria. It has been found that polypeptide-containing nitrogen sources such as hydrolyzed protein are effective in stimulating growth. Illustrative of compositions useful in this area are yeast extract, yeast autolysate, yeast hydrolysate, solubilized yeast, yeast food, pancreas extract, amino acids, hydrolyzed plant and animal protein, hydrolyzed casein, and mixtures thereof. Any nitrogen-containing or protein-containing source which will act as a growth stimulant can be used for this function. Non-protein nitrogen sources such as mono- or diammonium phosphate also act as stimulants. It is particularly preferred to use both a non-protein nitrogen source and a hydrolyzed protein.

Yeast in the substrate can range from about 0% to about 6% based on the weight of the dry solids in the initial substrate or from about 0% to about 0.5% and preferably from about 0.01% to about 0.1% based on the weight of the broth.

Trace vitamins and minerals of less than 1% and preferably less than 0.5% by weight of the substrate can also be included for their known beneficial effects to culture systems. These include B vitamins, ferrous sulfate, magnesium sulfate, and manganese sulfate. Generally, the Fe, Mg and Mn ions are present in some of the dairy products which act as the lactose source or in hydrolyzed protein such as the yeast extract.

To ensure the ability of $X.$ $campestris$ ATCC 31923 to produce polymer solutions in a lactose medium, the strain is routinely maintained in lactose-minimal medium during storage and inocula production. Prolonged maintenance of the strain in a complex medium containing alternate carbon sources containing whey protein, glucose and similar sources results in the loss of the ability of ATCC 31923 to produce viscous broths. This indicates a reversion of the strain to preferential growth on protein.

The concentration of the carbohydrate source such as lactose in the substrate is sufficient to allow formation of a functionalized dairy product having a viscosity greater than 200 centipoises and preferably greater than 800 centipoises at a $12s^{-1}$ shear rate. For instance, in fermenting *X. campestris* ATCC 31923, lactose concentration generally ranges from about 0.3% to about 8.5% by weight based on the broth volume. Dried whey in an amount ranging from about 0.5% to about 12% by weight based on the volume of the broth can be used to provide the necessary lactose. Preferably the lactose content ranges from about 1% to about 4% depending on the microorganism used.

In fermenting the *L. mesenteroides* ATCC 14935, from about 5% to about 20% and preferably from about 8% to about 12% sucrose is added. In fermenting the *X. campestris* ATCC 31922, from about 0.5% to about 12% and preferably from about 1% to about 3% glucose (or hydrolyzed lactose in an amount sufficient to provide that level of glucose) can be added.

The fermentation can be carried out at a pH ranging from about 5.5 to about 8, and preferably from about 6.0 to about 7.5 depending on the microorganism used. The fermentation temperature is sufficient for bacterial growth. Temperatures within the range of from about 20° C. to about 35° C. and preferably within the range of from about 25° C. to about 30° C. can be used.

The fermentation of *X. campestris* strains ATCC 31922 and 31923 is an aerobic fermentation while the fermentation of the *L. mesenteroides* is anerobic.

The fermentation is carried out for a period of time sufficient to provide the desired viscosity (from about 30 to about 70 hours).

The functionalized dairy product can be used as is, dried or blended with other ingredients (before or after drying).

The yeast-raised bakery products containing dietary fiber of the invention are well-known products which can be prepared by conventional methods such as the straight dough or by the sponge and dough methods. These products can be in the form of loaves, rolls, or any other yeast-raised format conducive to this type of product. The ingredients of these products are well-known to one of ordinary skill in the art. The functionalized dairy product can be added dry or, preferably, in a slurry. If added dry the functionalized dairy product can be added with the dry ingredients of the straight dough or with the sponge and/or dough, but preferably in the sponge when using the sponge and dough fermentation method. When the functionalized dairy product is added as a slurry, generally with enough water to make a slurry, the slurry is preferably added to the dry ingredients at the same time the water is added.

The dietary fiber sources available to the baking industry are of two main types: (1) natural fibers including wheat bran and other cereal brans, and (2) manufactured fibers such as alpha cellulose made from wood pulp. While both kinds can be effectively used, the natural fiber is preferred for esthetic reasons. However, bran has a greater effect on bread volume than cellulosic origin fibers. The dietary fiber can be used in the bread in an amount ranging from about 5% to about 25%, based on the weight of the flour not including any added fiber. As the amount of dietary fiber increases relative to the amount of flour, the effectiveness of the functionalized dairy product in maintaining a significant improvement in the volume in the absence of shortening decreases over a composition having no shortening. However, as the dietary fiber content is increased over 10%, effective specific volumes require the use of extended proof times and/or the use of a combination of shortening which can be in an amount less than the standard amount (<3%) in combination with the functionalized dairy product. Similar compositions with EMPLEX and monodiglycerides do not show effectiveness at dietary fiber contents of 15% and above. By the use of the combination of shortening and the functionalized dairy product of the present invention, specific volumes greater than those obtained using 3% shortening can be obtained while significantly reducing the hardness of the bread. Combinations of shortening and EMPLEX, as well as shortening and monodiglycerides at high fiber contents can be used to provide the same degrees of softness, though the specific volumes are lowered such as to make the product undesirable.

It has also been found that improved results can be achieved by adding the functionalized dairy product with starch and/or a fermentation time reducer such as the type disclosed in U.S. Pat. No. 4,500,548, the disclosure of which is incorporated herein by reference.

The starch can be any starch or blends thereof, modified or unmodified, which is soluble (swellable) under the conditions of use. The starch can be derived from cereal grains, i.e., corn, sorghum, rice and preferably wheat; tubers or roots such as cassava (tapioca), potato or arrowroot and the pith from sago palm. The starch is preferably unmodified and not treated to reduce viscosity (thin boiling) or dextrinized to improve the cold water solubility. The starch can be used in amounts ranging from about 50 percent to about 400 percent and preferably from about 50 percent to about 200 percent based on the dry weight of the functionalized dairy product.

Improved bran-containing bakery products can be prepared using mixtures of the functionalized dairy product with or without the starch and the fermentation time reducer for yeast-raised baked goods as described in U.S. Pat. No. 4,500,548, the disclosure of which is incorporated herein by reference.

The fermentation time reducer as described in U.S. Pat. No. 4,500,548 is prepared by fermenting a slurry of flour, optionally sugar and water (120 to 250 parts/100 parts flour) with baker's yeast for an extended period of time, i.e. over 12 hours. The fermented mixture with a pH of below 4.75 is dried to a moisture content of from about 4.5 percent to about 9 percent under conditions which will not drive off a major amount of the volatile flavor and aroma components. This product is available from Stauffer Chemical Company under the trademark FERMENTATION AID TM.

The fermentation time reducer is used in an amount sufficient to provide the desired reduction in fermentation time. The amount can range from about 2 percent to about 10 percent (add on) based on the weight of the flour. The amount of fermentation time reducer used is directly related to obtaining the desired reduction in fermentation in the baked goods without substantial loss of fermentation advantages. Other guides to the use of the fermentation time reducer are set forth in U.S. Pat. No. 4,500,548

The starch and/or fermentation time reducer can be added to the dry ingredients but are preferably slurried with enough water to make a slurry and added to the dry ingredients at the time of addition of the water. These ingredients can be added to the sponge or dough but preferably the sponge in a sponge and dough fermentation method. Preferably, the starch is contacted with water and the functionalized dairy product prior to addition to the bread.

The functionalized dairy product can be used in bread with standard ingredients other than flour and water such as yeast, yeast food, oxidants such as bromates, iodates or ascorbic acid, reducing agents such as sodium bisulfite, enzymes such as proteolytic and amylolytic enzymes, surfactants such as sodium and calcium stearoyl 2-lactylate, flavors, colors, antimycotics such as sodium and/or calcium propionate, dough conditioners, dairy solids and sweeteners, i.e. sucrose, dextrose, corn syrup. The functionalized dairy product can be used in a fiber-containing baked good containing from 0 to about 3% lipid such as vegetable oils and animal fats and oils.

The functionalized dairy product can be blended with any or all of these ingredients at the time of bread making or to formulate a bread base product for sale to the consumer.

It has been found that baked goods can be prepared in accordance with the present invention without dough conditioners and/or antistaling agents. As many commercial dough conditioners may have an oxidizing agent incorporated therein, deletion of the dough conditioner may require addition of small amounts of an oxidizer in amounts normally required in the baked goods. The amount of oxidizer added can be easily determined by one of ordinary skill in the art. Ascorbic acid is particularly preferred as it is a natural material though bromates and iodates can also be used.

The functionalized dairy product in the bakery goods is present in an amount sufficient to provide a dough conditioning effect of the type expected by one of ordinary skill in the art when using surfactants. The use of the functionalized dairy product improves dough stability by improving the starch gluten union, improves flexibility during gelatinization to improve gas cell film formation thereby improving volume; interacts with starch to slow down starch retrogradation to thereby slow down staling; and improves water absorption which gives a softer loaf and improves unit output. The baked goods containing the functionalized dairy product evidences, in addition to all of the above, an improvement in texture. The combination of the functionalized dairy product and the fermentation time reducer additionally provides the effect of reducing fermentation time and/or dough conditioner. The combination of the functionalized dairy product and the fermentation time reducer is effective in providing beneficial results in underdeveloped underfermented breads such as bread mixes for home use.

The functionalized dairy product can be used to reduce or replace mono/diglycerides, stearoyl lactylates and other surfactants such as lecithin, and ethoxylated mono/diglycerides as well as milk and milk replacer blends and mineral yeast foods with the addition of an oxidizing agent such as ascorbic acid. A reduction in the amount of shortening, sugar or gluten can be achieved using the functionalized dairy product. Improvement in dough conditioning effects can be achieved by using mono/diglycerides and/or stearoyl lactylates in combination with the functionalized dairy product. The functionalized dairy product is used in an amount ranging from about 0.25% to about 3.0%, and preferably from about 0.25% to about 1.5%. When included with the starch, the functionalized dairy product and starch is used in an amount sufficient to provide the stated amount of functionalized dairy product.

The invention will be more fully illustrated in the examples which follow. The functionalized dairy product used in the following examples was prepared by dry blending the product of the procedure of Example 1 of U.S. Pat. No. 4,444,792 with an equal amount of wheat starch. The dried composition as used in the Examples is available from as used in the Examples is available from Stauffer Chemical Company under the trademark EMPRUV TM.

EXAMPLE 1

A fiber bread was prepared by the straight dough method using the following formulation. All amounts are given in grams per 100 grams of flour/bran mixture. Appropriate batch sizes were prepared by increasing the ingredients proportionately. The functionalized dairy product had a viscosity of 1200 centipoises.

| Formulation: Ingredients | Amount |
| --- | --- |
| Bread flour/wheat bran | 100.0 |
| Water | 66–68 |
| Sugar | 6.0 |
| Salt | 1.5 |
| Soy flour | 4.0 |
| Bakers yeast | 3.5 |
| Shortening | see Table |
| Functionalized Dairy Product | see Table |
| Ascorbic acid | 88 ppm (flour basis) |

All the dry ingredients, including the functionalized dairy product, were dry blended. The yeast was then dry blended with the previously blended dry ingredients. The water at 26.7° C. was added and the mixture was blended in a jacketed bowl (McDuffy Bowl), with a water bath temperature of 23° C., attached to a Hobart Planetary Mixer for 1 minute at slow speed. After adding the shortening, mixing was continued for 10 minutes at medium speed. The final dough temperature was 27.7° C.

The dough was held in a fermentation cabinet at 29.4° C. for 2 hours. 625 grams of the dough was scaled out and held for 10 minutes for intermediate proof for the product of Table 1. For the products of Tables 2, 3, and 4, 540 grams of the dough were scaled out and pans smaller than that used in Table 1 were used in preparing the bread. The dough was rolled, molded, and placed in a pan and proofed to about 1.25 cm above the edge of the pan (except where stated) in a final proof box at 43° C. and 80% relative humidity. The bread was baked at 196° C. for 35 minutes.

The following results were obtained:

The softness was evaluated with a compressimeter using AACC method 74-10, the units being reported in grams of actual force needed to depress the center of a slice of bread 2.5 millimeters. The smaller the number, the softer the bread.

TABLE 1

| BREAD FLOUR 90%/WHEAT BRAN 10% | | | | | | | |
| --- | --- | --- | --- | --- | --- | --- | --- |
| | | Final Proof Time Mins | Baked Loaf Weight g | Baked Loaf Vol. cc | Sp. Vol. | Crumb pH | Softness |
| Shortening | 3.00% | 39 | 560 | 2475 | 4.40 | 5.41 | 20 |
| Shortening | 0.00% | 37 | 569 | 2300 | 4.04 | 5.44 | 25 |
| EMPRUV | 1.00% | | | | | | |
| Shortening | 0.00% | 35 | 562 | 2365 | 4.19 | 5.27 | 20 |
| Emplex | 1.00% | | | | | | |
| Shortening | 0.00% | 41 | 574.5 | 2012 | 3.50 | 5.52 | 27 |
| Mono/Diglyceride | 1.00% | | | | | | |
| Shortening | 2.00% | 38 | 559 | 2562 | 4.58 | 5.48 | 23 |
| EMPRUV | 0.75% | | | | | | |
| Shortening | 2.00% | 36 | 563.5 | 2425 | 4.30 | 5.36 | 18 |
| Emplex | 0.75% | | | | | | |
| Shortening | 2.00% | 38 | 556 | 2562 | 4.60 | 5.49 | 18 |
| Mono/Diglyceride | 0.75% | | | | | | |

Note:
1. Water increased by 1% when EMPRUV was added.
2. Proofed dough to 1.25 cm above rim of pans.

TABLE 2

| BREAD FLOUR 85%/WHEAT BRAN 15% | | | | | | | |
| --- | --- | --- | --- | --- | --- | --- | --- |
| | | Proof Time Mins | Loaf Weight g | Loaf Vol. cc | Sp. Vol. | Crumb pH | Softness 3 Days |
| Shortening | 0% | 34 | 493 | 1712 | 3.47 | 5.54 | 30 |
| Shortening | 3% | 36 | 489.5 | 2050 | 4.19 | 5.56 | 18 |
| Shortening | 0% | 30 | 494.5 | 1937 | 3.92 | 5.62 | 20 |
| EMPRUV | 2% | | | | | | |
| Shortening | 0% | 28 | 494 | 1812 | 3.67 | 5.42 | 19 |
| Emplex | 1% | | | | | | |
| Shortening | 2% | 33 | 488 | 2162 | 4.43 | 5.61 | 15 |
| EMPRUV | 1% | | | | | | |
| Shortening | 2% | 30 | 497 | 1887 | 3.80 | 5.42 | 13 |
| Emplex | 1% | | | | | | |
| Shortening | 2% | 35 | 496 | 1912 | 3.86 | 5.56 | 14 |
| Mono/Diglyceride | 1% | | | | | | |

Note:
1. Water increased by 1–1.5%.
2. Proofed dough to 1.25 cm above rim of pans.

TABLE 3

| BREAD FLOUR 80%/WHEAT BRAN 20% | | | | | | | |
| --- | --- | --- | --- | --- | --- | --- | --- |
| | | Proof Time Mins | Loaf Weight g | Loaf Vol. cc | Sp. Vol. | Crumb pH | |
| Shortening | 0% | 39 | 496.5 | 1487 | 3.00 | 5.55 | |
| Shortening | 3% | 33 | 491 | 1850 | 3.77 | 5.59 | |
| Shortening | 0% | 30 | 497 | 1637 | 3.30 | 5.66 | |
| EMPRUV | 2% | | | | | | |
| Shortening | 0% | 30 | 495 | 1550 | 3.13 | 5.47 | |
| Emplex | 2% | | | | | | |
| Shortening | 2% | 32 | 488 | 2000 | 4.10 | 5.63 | |
| EMPRUV | 1% | | | | | | |
| Shortening | 2% | 30 | 497 | 1612 | 3.24 | 5.49 | |
| Emplex | 1% | | | | | | |
| Shortening | 2% | 35 | 494 | 1875 | 3.80 | 5.62 | |
| Mono/Diglyceride | 1% | | | | | | |

Note:
1. Water increased by 1.5%.
2. Proofed dough to 1.25 cm above rim of pan.

TABLE 4

| BREAD FLOUR 80%/WHEAT FLOUR 20% | | | | | | | |
| --- | --- | --- | --- | --- | --- | --- | --- |
| | | Proof Time Mins | Loaf Weight g | Loaf Vol. cc | Sp. Vol. | Crumb pH | Softness 6 Days |
| Shortening | 0% | 58 | 495.5 | 1638 | 3.30 | 5.54 | >32 |
| Shortening | 3% | 55 | 489 | 2100 | 4.30 | 5.58 | 30 |
| Shortening | 0% | 55 | 497 | 1900 | 3.82 | 5.63 | 24 |
| EMPRUV | 2% | | | | | | |
| Shortening | 2% | 53 | 487 | 2200 | 4.52 | 5.63 | 19 |
| EMPRUV | 1% | | | | | | |

TABLE 4-continued

| BREAD FLOUR 80%/WHEAT FLOUR 20% | | | | | | | |
|---|---|---|---|---|---|---|---|
| | | Proof Time Mins | Loaf Weight g | Loaf Vol. cc | Sp. Vol. | Crumb pH | Softness 6 Days |
| Shortening | 2% | 50 | 489 | 1787 | 3.66 | 5.47 | 16 |
| Emplex | 1% | | | | | | |
| Shortening | 2% | 59 | 492 | 2025 | 4.12 | 5.60 | 18 |
| Mono/Diglyceride | 1% | | | | | | |

Note:
1. Water increased by 1.5%.
2. Proof dough to 2.5 cm above rim of pan.

As can be seen from the results of Table 1, the substitution of the 3% shortening with either EMPRUV or Emplex provided results which are sufficiently similar to the 3% shortening as to be commercially feasible. The use of mono/diglycerides in the absence of shortening sufficiently decreases the specific volume and increases the hardness such that the product would not be acceptable.

The use of 2% shortening in combination with EMPRUV or mono/diglyceride provides a bread which is better than the 3% shortening. The use of 2% shortening and 0.75% Emplex provides bread with slightly less specific volume and softness, though these can be considered to be within experimental error.

In the product of Table 2, EMPRUV alone provides significantly better specific volume and softness over no shortening and Emplex without shortening. EMPRUV with shortening provides significantly improved results over 3% shortening alone. Shortening and Emplex and shortening and mono/diglycerides are not effective replacements for 3% shortening. As can be seen by the composition in Table 2, the shortening level can be decreased when combined with EMPRUV, while significantly improving the results.

Similarly, EMPRUV at 2% alone provides improved results over the absence of shortening and over Emplex in the absence of shortening. The use of 1% EMPRUV in combination with 2% shortening provides significantly better results than the 3% shortening alone. The use of 2% shortening and 1% Emplex and 2% shortening and 1% mono/diglycerides does not show an improvement over 3% shortening alone.

In Table 4, the use of 2% EMPRUV shows a significant improvement in specific volume over a bread prepared in the absence of shortening. A bread prepared with shortening and EMPRUV shows a significant increase in specific volume over bread with 3% shortening, while the use of shortening and Emplex or shortening and mono/diglycerides do not even show a specific volume equal to the 3% shortening. The composition of shortening and EMPRUV shows an improvement in specific volume with a corresponding increase in softness.

The previous data shows that EMPRUV can be used in the absence of shortening to improve the specific volume of fiber-containing breads over breads containing no shortening. The use of a reduced amount of shortening in combination with EMPRUV shows an equivalent or increased specific volume in comparison to a shortening containing bread, particularly as the amount of bran increases relative to the bread flour. Bread softness can be maintained even as the amount of fiber increases.

What is claimed is:

1. Yeast-raised bakery products containing added dietary fiber in an amount ranging from about 5% to about 25% by weight based on the weight of the flour in the dough of the bakery product, wherein said dough contains from about 0.25% to about 3% by weight of the flour in the product of a functionalized dairy product having a viscosity of about 200 centipoises at a shear rate of $12s^{-1}$ prepared by fermenting a polymer-producing microorganism of the genus Xanthomonas or Leuconostoc with a dairy based substrate containing a growth-supporting carbohydrate source for said microorganism.

2. The product of claim 1 wherein the microorganism is of the genus Xanthomonas.

3. The product as recited in claim 1 wherein the microorganism is *Xanthomonas campestris*.

4. The product of claim 1 wherein the microorganism is *Leuconostoc mesenteroides*.

5. The product as recited in claim 1 wherein the microorganism is selected from the group consisting of Xanthomonas campestris ATCC 31922, Xanthomonas campestris ATCC 31923, Leuconostoc mesenteroides ATCC 14935 and mixtures thereof.

6. The product as recited in claim 1 wherein the microorganism is *Xanthomonas campestris* ATCC 31923 and the carbohydrate is lactose.

7. The product of claim 1 wherein yeast extract is added to the dairy product before fermentation.

8. The product as recited in claim 1 wherein said functionalized dairy product is used in combination with from about 0% to about 3% of a source of lipid.

9. The product as recited in claim 1 wherein said functionalized dairy product is used in combination with starch.

10. The product of claim 9 wherein the starch is present in an amount ranging from about 50% to about 400% based on the dry weight of the functionalized dairy product.

11. The product of claim 9 wherein the starch is contacted with water and the functionalized dairy product before addition to the bread ingredients.

12. The product of claim 1 which further contains a fermentation time reducer.

13. A process for producing bakery products containing added dietary fiber with improved antistaling and dough conditioning characteristics which comprises including, in the dough of a bakery product containing from about 5% to about 25% added fiber based on the weight of the flour not including any added fiber, from about 0.25% to about 3% based on the weight of the flour in the product of a functionalized dairy product having a viscosity of about 200 centipoises at a shear rate of $12s^{-1}$ prepared by fermenting a dairy substrate with a polymer-producing microorganism of the genus Xanthomonas or Leuconostoc sufficient to provide an antistaling effect, said dairy substrate containing a growth-supporting carbohydrate source for said microorganism.

14. The process as recited in claim 13 wherein the microorganism is *Xanthomonas compestris*.

15. The process as recited in claim 13 wherein the microorganism is *Leuconostoc mesenteroides*.

16. The process as recited in claim 13 wherein the microorganism is selected from the group consisting of Xanthomonas campestris ATCC 31922, Xanthomonas campestris ATCC 31923, Leuconostoc mesenesteroides ATCC 14935 and mixtures thereof.

* * * * *